United States Patent [19]
Hanzawa et al.

[11] Patent Number: 5,590,364
[45] Date of Patent: Dec. 31, 1996

[54] SIGNAL PROCESSING APPARATUS

[75] Inventors: Kohtaro Hanzawa, Iruma; Goro Sakata, Mitaka; Kikuji Tanaka, Fussa, all of Japan

[73] Assignee: Casio Computer Co., Ltd., Tokyo, Japan

[21] Appl. No.: 407,498

[22] Filed: Mar. 17, 1995

Related U.S. Application Data

[63] Continuation of Ser. No. 150,542, Nov. 10, 1993, which is a continuation of Ser. No. 770,646, Oct. 3, 1991, abandoned.

[30] Foreign Application Priority Data

Oct. 31, 1990 [JP] Japan ................................ 2-294569

[51] Int. Cl.⁶ .......................................... G06F 9/445
[52] U.S. Cl. .......................... 395/800; 395/701; 381/61; 84/600
[58] Field of Search ...................... 395/700, 800, 395/550; 381/61; 84/622, 600, 601, 602

[56] References Cited

U.S. PATENT DOCUMENTS

| | | | |
|---|---|---|---|
| 4,105,864 | 8/1978 | Barkovitz | 370/18 |
| 4,920,482 | 4/1990 | Hasebe et al. | 364/200 |
| 4,998,281 | 3/1991 | Sakata | 381/63 |
| 5,034,962 | 7/1991 | Yamamoto et al. | 375/8 |
| 5,045,993 | 9/1991 | Murakami et al. | 364/200 |
| 5,129,094 | 7/1992 | Kiuchi | 395/800 |
| 5,210,806 | 5/1993 | Kihara et al. | 381/103 |

FOREIGN PATENT DOCUMENTS 3-45400  7/1991  Japan.

OTHER PUBLICATIONS

Albert Paul Malvino, Digital Computer Electronics An Introduction to Microcomputers, 1983, pp. 121–123, 135, 136, 140–164.

Albert P. Malvino, "Digital Computer Electronics", 1983, pp. 90, 99, 101, 109.

*Primary Examiner*—Alvin E. Oberley
*Assistant Examiner*—Michael T. Richey
*Attorney, Agent, or Firm*—Frishauf, Holtz, Goodman, Langer & Chick

[57] ABSTRACT

In a signal processing apparatus which stores a program inside, and performs a series of processes on a received signal according to the program, such as an arithmetic operation or a delay process, and outputs the processed signal, for rewriting the program in order to change the contents of the processing. Program data is prevented from being output in synchronism with a sampling clock generated at the timing of an input signal. This design can minimize noise occurring due to a change in the algorithm of the signal processing during signal processing. Further, in the case where a program for a separate signal processing circuit is rewritten in response to an instruction that is given from outside at an arbitrary timing, noise can also be minimized by proceeding with the rewriting in synchronism with a sampling clock.

12 Claims, 6 Drawing Sheets

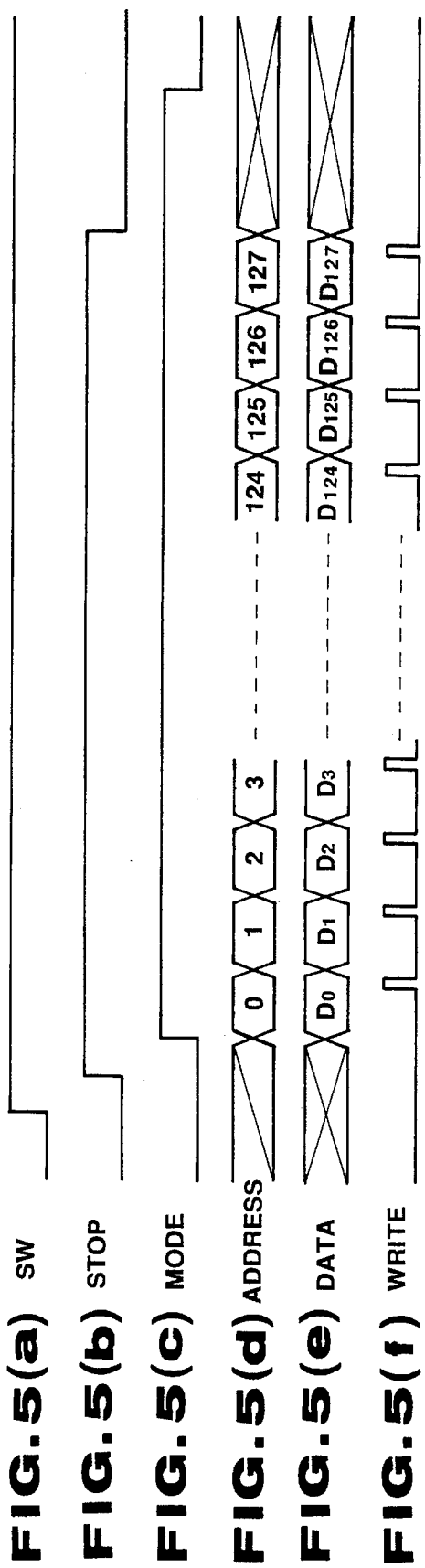

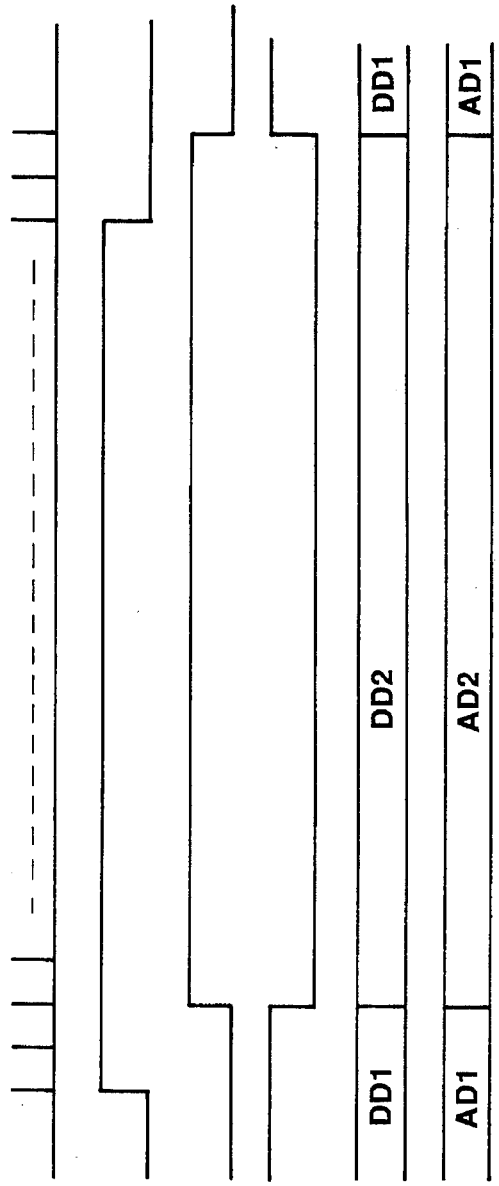

SIGNAL PROCESSING APPARATUS

This application is a continuation of application Ser. No. 08/150,542, filed Nov. 10, 1993, which is a continuation of application Ser. No. 07/770,646, filed Oct. 3, 1991 (now abandoned).

BACKGROUND OF THE INVENTION

1. Field of the Invention

The present invention relates to a signal processing apparatus, and more particularly to a signal processing apparatus which permits a signal processing program for imparting an effect to a signal from an electronic musical instrument to be rewritten.

2. Description of the Related Art

A conventional signal processing apparatus for use in an electronic musical instrument has a memory having a program stored inside, and processes a received signal within one cycle of a sampling clock according to the program. In the case of receiving a musical tone signal with eight polyphonic sounds from an electronic musical instrument, for example, a time-dividing process with respect to the eight musical tones is performed within one sampling clock. The memory storing this program is generally constituted of a ROM, so that the contents of the program cannot be changed later.

It is proposed that the memory includes a rewritable RAM, so that the program can be rewritten later as needed. This ensures that a single signal processing apparatus performs another signal process without its hardware structure being changed, thereby improving the general-purpose use of the apparatus. Further, during the processing of continuously-input signals, the signal processing apparatus can perform a different process on the signals to impart a quite different effect to the signals.

If the program is changed while running in the conventional signal processing apparatus, however, the algorithm of the signal processing is changed, thereby generating noise. In a process of adding reverberation to a musical tone signal as the above-described signal processing, for example, a program associated with reverberation to be produced should be stored in a program memory in order to alter the form of the reverberation. If a program corresponding to the program memory is rewritten to change from certain reverberation (reverberation 1) to another reverberation (reverberation 2), a parameter memory or a work memory in a DSP (digital signal processor), for example, sometimes has data before the rewriting of the program. Under such circumstances, even if only the program is changed, the data might be improperly converted so that an unexpected and undesired musical tone will be released.

SUMMARY OF THE INVENTION

It is an object of the present invention to provide a signal processing apparatus which permits a signal processing program to be rewritten, and will not cause noise in rewriting the program.

According to one aspect of the present invention, a signal processing apparatus comprises storing means for storing a program; signal processing means for processing a signal received in a predetermined cycle of a sync signal according to the program stored in the storing means and outputting a processed signal; rewriting instructing means for instructing rewriting of stored contents of the storing means; sync rewrite signal outputting means for outputting a sync rewrite signal from the rewriting instructing means in synchronism with the sync signal; rewriting means for stopping sending the program from the storing means to the signal processing means, in response to the sync rewrite signal from the sync rewrite signal outputting means, and enabling the stored contents of the storing means to be rewritten; and transfer means for transferring another program to the storing means in response to the sync rewrite signal.

According to this structure, when the rewriting instructing means sends a signal for instructing a rewrite of the contents of the storing means, the sync signal outputting means processes this signal and outputs it as a predetermined sync signal, for example, a sync rewrite signal synchronizing with a sampling clock. The sampling clock indicates timing between a process and its data. If a musical tone signal has eight polyphonic sounds, for example, the sampling clock indicates the timing when processing with respect to the eight sounds is ended. In response to the sync rewrite signal in synchronism with the sampling clock, the rewriting means enables the contents stored in the storing means to be rewritten. The storing means receives and stores a program to be rewritten according to the sync rewrite signal.

The program is, therefore, rewritten in synchronism with the sampling clock, thus preventing the program from being altered in the processing of one data signal. As a result, even if program rewriting is arbitrarily executed, signal processing is temporarily stopped when a series of processes is completed, and then the program is altered. Thus, noise can be prevented from occurring.

It is another object of the present invention to provide a signal processing apparatus which enables a signal processing program to be rewritten, and performs signal processing according to a new program in synchronism with a timing for receiving a signal to be processed, in order to prevent a problem, such as the occurrence of noise in rewriting.

According to another aspect of the present invention, a signal processing apparatus comprises storing means for storing a program; signal processing means for processing a signal received in a predetermined cycle of a sync signal according to the program stored in the storing means and outputting a processed signal; rewriting instructing means for instructing rewriting of stored contents of the storing means; transfer means for transferring a different program to the storing means in response to a rewriting instruction from the rewriting instructing means; rewriting means for writing the different program from the transfer means into the storing means in response to the rewriting instruction from the rewriting instructing means; sync rewrite signal outputting means for outputting an instruction signal from the rewriting instructing means as a sync rewrite signal in synchronism with the sync signal; and switching means for supplying the different program stored in the storing means to the signal processing means in place of the program in response to the sync rewrite signal from the sync rewrite signal outputting means.

With this structure, since the rewritten program is supplied to the signal processing means in synchronism with the timing at which the signal is sent, it is possible to prevent a program from being changed during processing of a data signal.

It is a further object of the present invention to provide a signal processing apparatus which enables a program for processing a received signal to be rewritten, and prevents problems caused by the program rewriting, such as an interruption of the signal processing and the occurrence of noise.

According to a further aspect of the present invention, a signal processing apparatus comprises storing means for storing a program; signal processing means for processing a signal received in a predetermined cycle of a sync signal according to the program stored in the storing means and outputting a processed signal; rewriting instructing means for instructing rewriting stored contents of the storing means; sync rewrite signal outputting means for outputting a signal from the rewriting instructing means as a sync rewrite signal in synchronizing with the sync signal; transfer means for transferring a different program in response to the sync rewrite signal from the sync rewriting signal outputting means; rewriting control means for setting the storing means in a rewritable state in response to the sync rewrite signal; and rewriting means for supplying the different program from the transfer means to the storing means and the signal processing means in response to the sync rewrite signal, and after transferring is over, supplying the different program stored in the storing means to the signal processing means in synchronism with the sync signal.

With the structure described above, a program is supplied to the signal processing means at the same time it is written, so that the signal processing is not interrupted. Further, since program rewriting is performed in synchronism with a sync signal, an inconvenience, such as the occurrence of noise originated from altering the program, does not occur.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

Other objects and characteristics of the present invention will be readily apparent to those skilled in the art from the description of a preferred embodiment of the present invention with reference to the accompanying drawings of which:

FIGS. 5(a) to 5(f) show a timing chart showing changes in signals in individual sections; and FIGS. 6(a) to 6(f) show a timing chart representing changes in signals in individual sections as viewed from the DSP side.

DETAILED DESCRIPTION OF THE PREFERRED EMBODIMENTS

A preferred embodiment of the present invention will now be described referring to the accompanying drawings.

Figure 1:
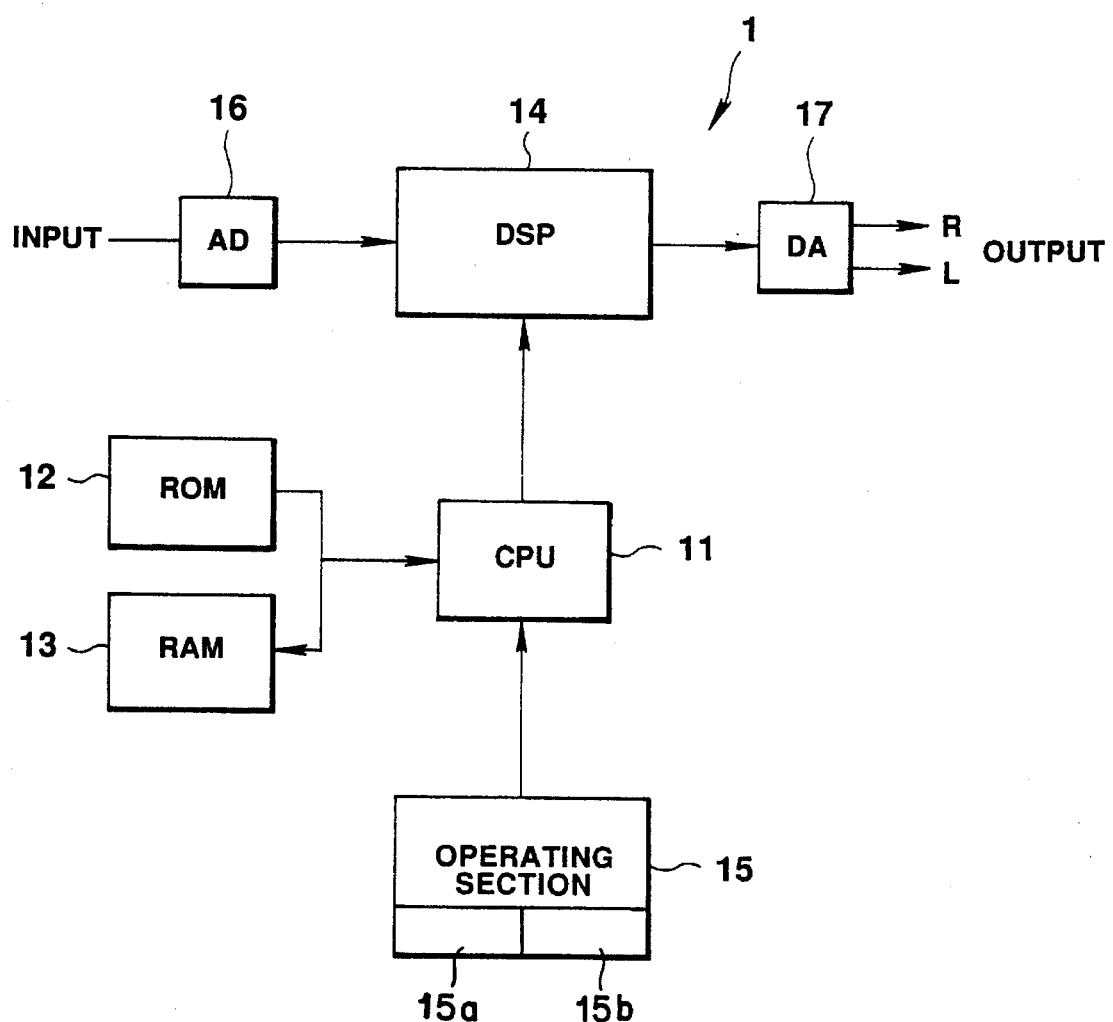
FIG. 1 is a diagram illustrating the general structure of a signal processing apparatus according to one embodiment of the present invention.

FIG. 1 illustrates the general structure of a signal processing apparatus 1. A CPU 11 performs the general control of the system and processes various information. The CPU 11 controls various operations of the signal processing apparatus in accordance with a microprogram stored in a ROM 12. The ROM 12, a work RAM 13, a DSP (Digital Signal Processor) 14 and an operating section 15 are connected to the CPU 11. The ROM 12 stores a program for the CPU 11 sent via an internal bus and predetermined fixed data. The RAM 13 temporarily stores parameters and data to be used in arithmetic operations and operation results. The DSP 14 executes signal processing, such as adding a reverberation effect to a musical tone signal. The operating section 15 has a mode select switch 15a for instructing rewriting of the program and a switch 15b for setting a modulation effect to add a modulation effect to the musical tone signal.

With an input from the operating section 15, the CPU 11 instructs rewriting of the contents of a program memory 21 (FIG. 2) to be described later, as well as reads various parameters for adding effects from the RAM 13 and supplies them to the DSP 14.

The DSP 14 receives a digital musical tone signal from an A/D converter 16 to which an analog input is supplied. Using a parameter RAM storing an effect-adding parameter, the DSP 14 executes a DSP operation program (not shown) to add an effect to the received musical tone signal, and then sends the resultant signal to a D/A converter 17. The D/A converter 17 then converts the digital signal into an analog signal, which is output from a right channel (Rch) and left channel (Lch).

Figure 2:
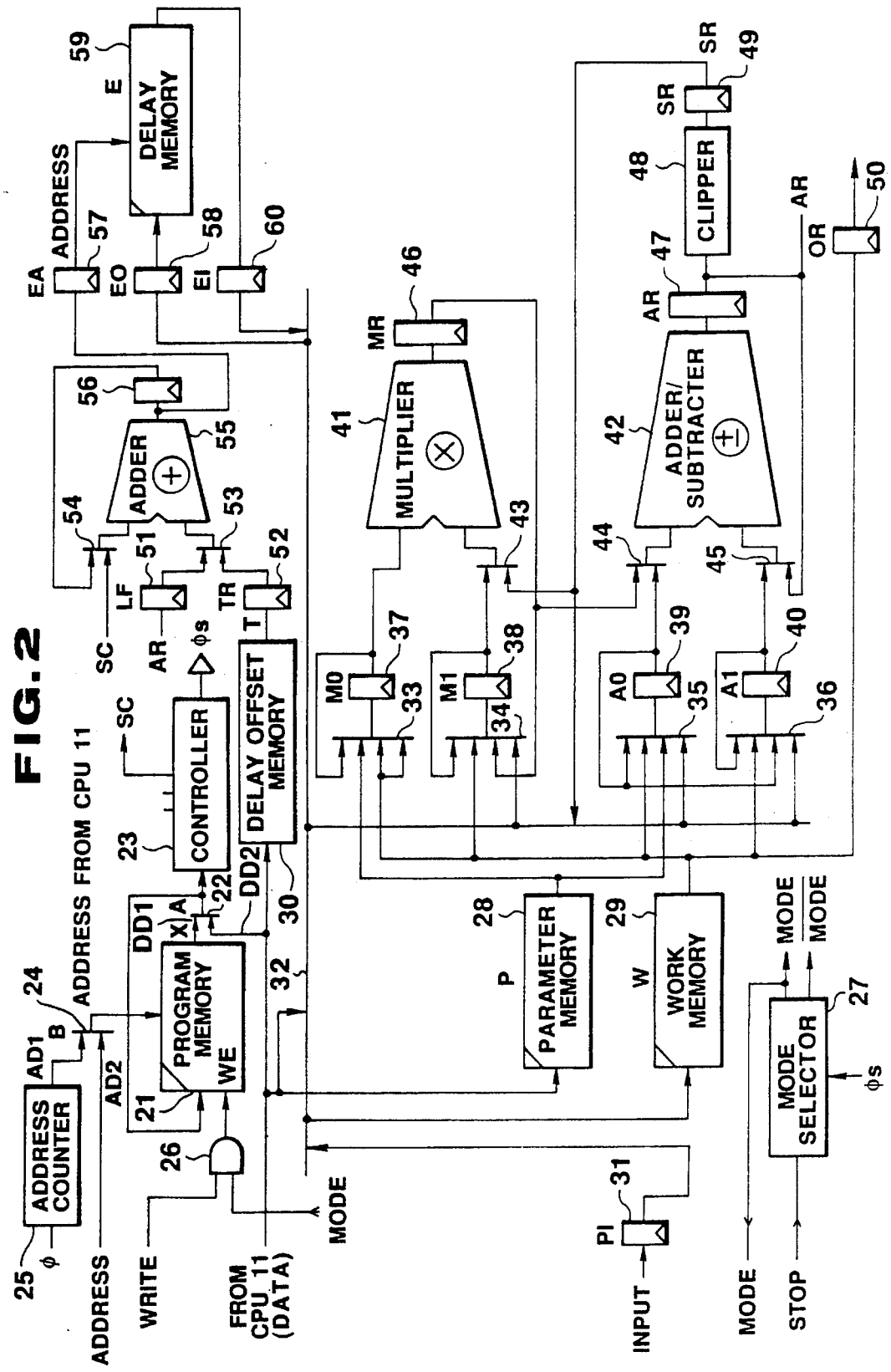
FIG. 2 is a diagram showing the internal circuit structure of a DSP.

FIG. 2 illustrates the internal structure of the DSP 14.

The program memory 21 stores predetermined program data. Program data is transferred through a selector (A) 22 to the program memory 21. The selector (A) 22 has been supplied program data from the program memory 21 and the CPU 11. The selector (A) 22 is designed so that either data is sent via the selector (A) 22 to a controller 23 and the program memory 21. The program memory 21 has an address input terminal connected to an address counter 25 via a selector (B) 24. An address signal of address data from either the address counter 25 or the CPU 11 is supplied via the selector 24 (B) to the program memory 21. A write pulse is sent through an AND gate 26 to a write enable terminal WE of the program memory 21. The program memory 21 sequentially supplies the contents of a program to the controller 23 in accordance with an address designated by an output AD 1 of the address counter 25 or address data AD2 of the CPU 11. Mode signals "mode" and "$\overline{\text{mode}}$" are supplied to the selector (A) 22, selector (B) 24 (not shown) and the AND gate 26 to select a mode for rewriting the contents of the program memory 21. The selectors 22 and 24, and the AND gate 26 serve as rewriting means for selecting a bus line for each input signal (program data, address data or write pulse) according to the mode signal "mode" or "$\overline{\text{mode}}$". A mode selector 27 synchronizes a STOP signal from the CPU 11, instructing rewriting of the contents of the program memory 21, with a sampling clock signal φs, and sends the STOP signal as mode signal "mode" or "$\overline{\text{mode}}$". A detailed circuit structure will be described later referring to FIG. 3.

Based on the contents of data sent from the program memory 21, the controller 23 outputs various control signals and a sampling counter (SC) output for data transfer and arithmetic operations between registers and memories both to be described later, and for enabling and disabling gates and latches, and executes the desired signal processing.

A parameter memory (P) 28 is a register which stores various parameters. The CPU 11 reads those parameters from the RAM 13 and supplies them to the parameter memory (P) 28 in the DSP 14. A work memory (W) 29 temporarily holds a wave signal or the like prepared in the DSP 14. A delay offset memory (T) 30 is a register which stores an offset value of the address of a delay memory (E)

59 to be described later. The CPU 11 reads the offset value from the RAM 13 and sends it to the delay offset memory (T) 30 in the DSP 14.

The delay memory (E) 59 has an address which is its offset value added to a counter value SC that is incremented every sampling. A delay of data written in the delay memory 59 at a certain offset value is represented by the difference between the offset value and an offset value of an address to be read. Data is read out from the delay memory 59 via a register (EI) 60 and written therein via a register (EO) 58. The address is written in the delay memory 59 via a register (EA) 57.

An input register (PI) 31 stores digital input signal data from a tone generator (not shown), and supplies it via an internal bus 32 to individual sections.

The outputs of the parameter memory (P) 28, the work memory (W) 29 and the input register (PI) 31 are sent together with the outputs from individual registers (which will be described later) to the gate terminals of gates 33 to 36. The outputs from the gates 33 to 36 are sent respectively to registers (M0) 37, (M1) 38, (A0) 39 and (A1) 40. The registers (M0) 37 and (M1) 38 store data in operation which is to be supplied to a multiplier 41, while the registers (A0) 39 and (A1) 40 store data in operation which is to be supplied to an adder/subtractor 42. The outputs of the register (M1) 38 and a register (SR) 49 to be described later are sent via a gate 43 to the multiplier 41. The outputs of the register (A0) 39 and a register (MR) 46 to be described later are sent via a gate 44 to the adder/subtractor 42. The outputs of the register (A1) 40 and a register (AR) 47 to be described later are sent via a gate 45 to the adder/subtractor 42. The result of the multiplication done in the multiplier 41 is stored in the register (MR) 46 whose output is supplied to the gates 34 and 44. The result of the operation done in the adder/subtractor 42 is stored in the register (AR) 47 whose output is sent to the gate 45 and also to the register (SR) 49 via a clipper circuit 48. This clipper circuit 48 serves to prevent an overflow. The output of the register (SR) 49 is sent to the gate 43, and also supplied as the result of an operation of one musical tone to the work memory (W) 29 via the internal bus 32.

When the operation result is stored in the work memory (W) 29 and a series of processes is completed, data in the work memory (W) 29 is transferred to an output register (OR) 50, which sends the received data to a device in the succeeding stage.

The output of the register (AR) 47 is supplied to a register (LF) 51, while the output of the delay offset memory (T) 30 is sent to a register (TR) 52. The outputs of the registers (LF) 51 and (TR) 52 are supplied via a gate 53 to an adder 55. The output of the sampling counter (SC) is sent via a gate 54 to the adder 55, together with the output of a register 56 to be described later. The result of an operation in the adder 55 is stored in the register 56, and is sent to the register (EA) 57. The value of the register (EA) 57 where the output of the sampling counter (SC) is stored is sent as an address to the delay memory 59. A musical tone, which is stored in the input register (PI) 31 and is to be processed, is supplied to the register (EO) 58. The output of the register (EO) 58 is sent to the delay memory (E) 59. The delay memory (E) 59 provides a read address with a desired time change to modulate input signal data. The delay memory (E) 59 outputs data, modulated by a predetermined delay according to an address difference, to the register (EI) 60.

Figure 3:
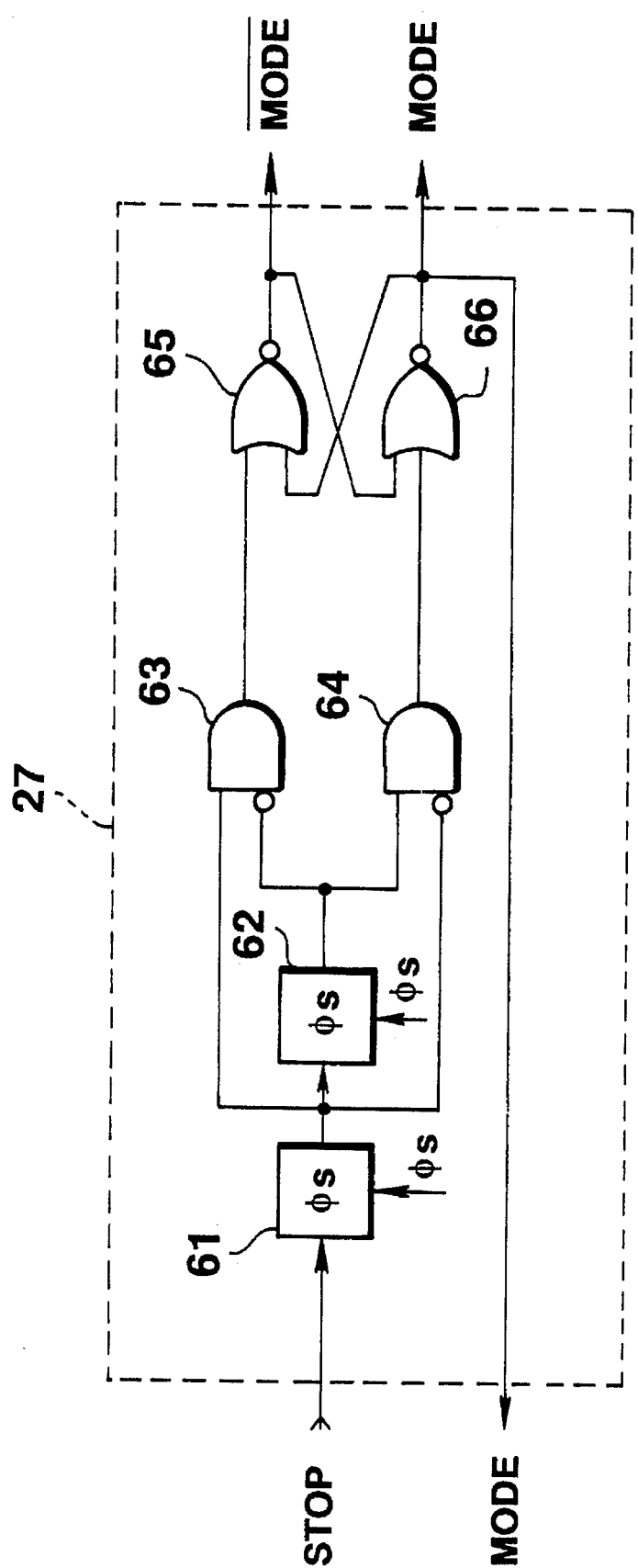
FIG. 3 is a diagram illustrating the circuit structure of a mode selector.

FIG. 3 exemplifies the circuit structure of the mode selector 27 shown in FIG. 2. The mode selector 27 includes two-staged flip-flops 61 and 62, AND gates 63 and 64 and NOR gates 65 and 66. The flip-flops 61 and 62 hold a STOP signal from the CPU 11 in synchronism with a sampling clock signal $\phi$s. The AND gates 63 and 64 receive the outputs from the flip-flops 61 and 62 at their non-inverting input terminals, respectively. AND gates 63 and 64 also receive on their inverting inputs the outputs from the flip-flops 62 and 61, respectively. The NOR gates 65 and 66 latch the outputs of the AND gates 63 and 64, respectively. In this embodiment, flip-flops 61, 62 in two stages are provided as means for outputting the STOP signal in synchronism with the sampling clock signal $\phi$s. The two-staged flip-flops 61 and 62 permit a received STOP signal to be output after being latched twice, thus preventing the unstable status of a signal from being output. The arrangement of the mode selector 27 is not limited to the one shown in FIG. 3. The mode selector 27 may take any other circuit arrangement as long as it is designed to output a signal for instructing rewriting of the contents of the program memory 21 (STOP signal from the CPU 11 in this embodiment) in synchronism with the sampling clock signal $\phi$s.

The operation of this embodiment will now be described.

Figure 4:
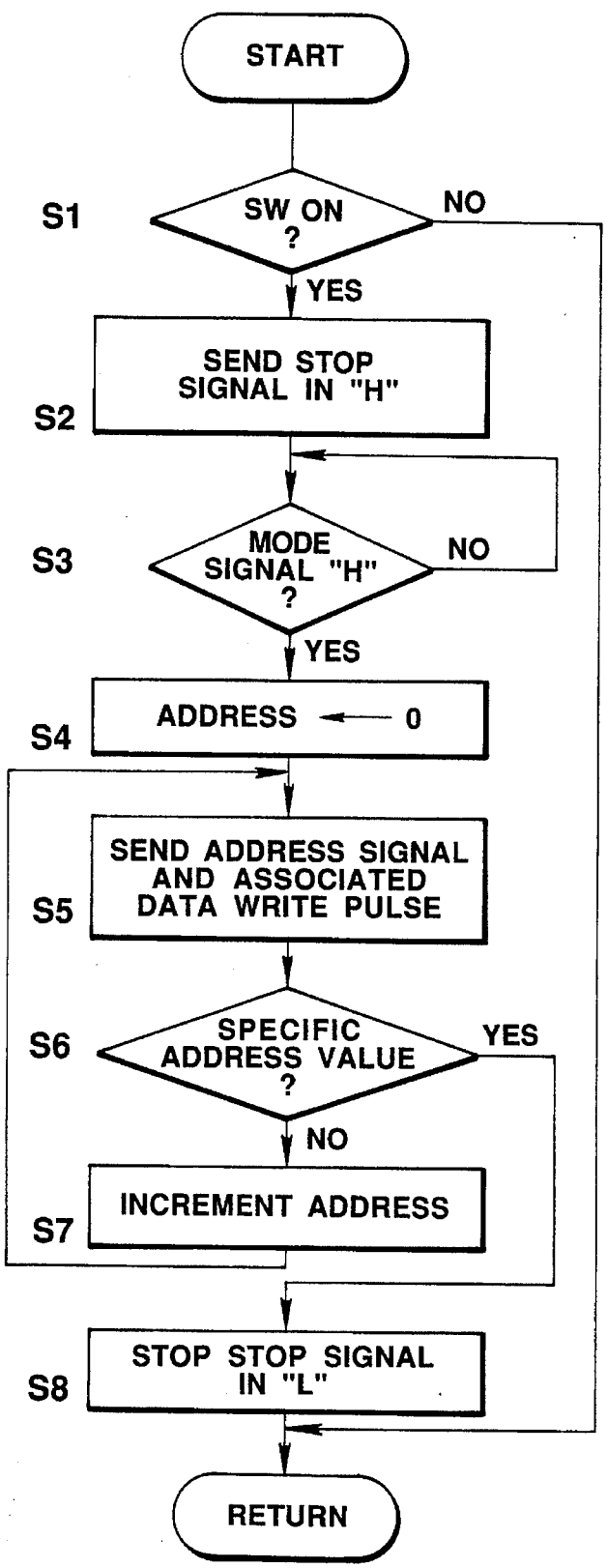
FIG. 4 is a flowchart representing the operation of a CPU.

FIG. 4 is a flowchart showing the operation of the CPU 11, i.e., mode selection for rewriting a program. A symbol Sn (n=1, 2, ... 8) in the chart indicates each step of the flow.

It is determined in step S1 whether or not a mode select switch SW of the operating section 15 is turned on. If the mode select switch is turned on as shown in FIG. 5(a), the CPU 11 judges that an operation to rewrite a signal processing program has been done, and advances to step S2. If the mode select switch is not turned on, the CPU 11 terminates the process.

In step S2, the CPU 11 sends a STOP signal to the mode selector 27 (see FIG. 5(b)). It is determined in step S3 if the mode signal "mode" from the mode selector 27 is at a high (H) level. When the mode signal "mode" is not at a high level, the flow returns to step S3 to wait until the mode signal "mode" becomes a high level. When the mode signal "mode" becomes a high level (see FIG. 5(c)), the CPU 11 sets "0" to an address to rewrite the program in step S4 (Address←0). In step S5, the CPU 11 sends an address signal, and associated data and write pulse to individual circuits in the DSP 14 as shown in FIGS. 5(d) to 5(f). In response to the mode signals "mode" and "$\overline{\text{mode}}$" from the mode selector 27, the selectors (A) 22 and (B) 24 in the DSP switch the bus lines, so that program data DD2 is supplied to the controller 23 and the program memory 21 and address data AD2 is sent to the program memory 21. The data in the program memory 21 can therefore be rewritten by the program data DD2, and at the same time the controller 23 executes a process using the program data DD2. In step S6 it is determined if the address has reached a specific value (e.g. 128 steps). When the address is still below the specific value, the CPU 11 judges that rewriting the program is not yet completed, and increments the address in step S7, returning to step S5. When the address has reached the specific value, the CPU 11 then judges that rewriting is completed, and advances to step S8. In step S8, the CPU 11 renders the STOP signal to have a low (L) level as shown in FIG. 5(b) in order to return the mode switching to the normal state, thus ending the process. As a result, the selector (A) 22 supplies program data DD1 from the program memory 21 again to the controller 23. The program data DD1 is identical to the updated program data DD2 from the CPU 11. The controller 23 therefore performs signal processing in accordance with the program data DD2.

FIGS. 5(a) to 5(f) and FIGS. 6(a) to 6(f) are timing charts representing changes in signals in the above-described individual sections. A program is to be rewritten as follows by executing the sequence of processes as shown in FIGS. 5(a) to 5(f) and FIGS. 6(a) to 6(f). As shown in FIG. 5(a), when the select switch SW in the operating section 15 is turned on, the CPU 11 accordingly generates a STOP signal to instruct mode switching and sends the signal to the mode selector 27. The mode selector 27 then generates a mode signal "mode" and an inverted mode signal "mode" by synchronizing the STOP signal with sampling clock signal φs. The mode signal "mode" is sent to the CPU 11, which in turn supplies the address data AD2 and the program data DD2 to the DSP 14 as shown in FIGS. 5(d) and 5(e). The mode signals "mode" and "mode" from the mode selector 27 are sent to the selector (A) 22 and (B) 24, and the AND gate 26 (not shown). When the mode signal "mode" becomes a high level, the selectors (A) 22 and (B) 24 select the bus lines to receive data from the CPU 11. At the normal time (or when a program is not being rewritten), the program data DD1 is sent from the program memory 21 to the controller 23 and the address data AD1 is sent from the address counter 25 to the program memory 21. As shown in FIGS. 6(e) and 6(f), however, the data DD1 and AD1 are to be replaced with the program data DD2 and address data AD2 both from the CPU 11 when the mode is changed. The AND gate 26 is enabled when receiving the mode signal "mode," so that the CPU 11 sends a write pulse to the program memory 21 (see in FIG. 5(f)). As a result, a predetermined program from the CPU 11 is stored in the program memory 21, and at the same time, the controller 23 is operated according to the program data DD2. When the mode signal "mode" becomes a low level again, the selector (A) 22 sends the program data DD1 from the program memory 21 to the controller 23. Although the program data DD1 is input to the program memory 21, the data in the program memory 21 will not be rewritten because the write pulse is not generated at this point of time.

As described above, a signal processing apparatus according to this embodiment comprises the program memory (storing means) 21 for storing a program to generate predetermined reverberation, the DSP 14 for processing an input signal PI in one cycle of a predetermined sampling clock signal φs according to the program stored in the program memory 21, the CPU 11 (rewriting instructing means) for instructing rewriting of the contents of the program memory 21 by an ON signal for the mode select switch of the operating section 15, the mode selector 27 (sync rewrite signal outputting means) for outputting a STOP signal as a mode signal "mode" from the CPU 11 to instruct rewriting of the memory in synchronism with the sampling clock signal φs, the selectors (A) 22 and (B) 24, and the AND gate 26 (rewriting means) for stopping the address data AD1 from the address counter 25 and the associated program data DD1 from the program memory 21, in response to the mode signal "mode" (sync rewrite signal) from the mode selector 27, and setting the contents in a rewritable state, and transfer means (the CPU 11) for transferring a program to the program memory 21 in response to the mode signal "mode." It is, therefore, possible to rewrite a program in synchronism with the sampling clock signal φs, to prevent improper conversion of the algorithm caused by alteration of the program during the signal processing. Further, the occurrence of noise is surely prevented when a program is being rewritten. As a result, if the signal processing apparatus embodying the present invention is applied to a signal processing apparatus which gives a delay vibrato effect to an input acoustic signal, the form of the output acoustic signal can be varied by rewriting the program in the program memory 21. Further, since the noise does not occur as a result of the rewriting, a program can be rewritten any time during the signal processing, providing more effective means for processing an input acoustic signal.

According to the embodiment, even during rewriting of the program in the program memory 21, the DSP is performing the signal processing according to the rewritten program, so that the process will not be interrupted during the program rewriting.

The signal processing apparatus according to the present invention can be used in all types of signal processing apparatuses which process an input signal in the cycle of a predetermined sampling clock, such as a tone generator of an electronic musical instrument and an audio system.

As described above, the signal processing apparatus according to the present invention has only to generate a sync rewrite signal (mode signal) by synchronizing a signal (STOP signal) for instructing rewriting of a program with a sampling clock φs, and to rewrite a program based on the mode signal. The number of the selectors and gates and their positions may be altered as needed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A signal processing apparatus comprising:

storing means for storing contents including a first program;

processing means for processing an input signal based on the first program received from said storing means within a period of a cycle of a sync signal and for outputting a processed signal;

instructing means for generating an instruction signal for instructing rewriting of said contents stored in said storing means;

instruction signal outputting means for outputting the instruction signal generated by said instructing means, in synchronism with the sync signal which is generated immediately after the instruction signal is generated by said instruction means;

control means for preventing the first program from being sent from said storing means to said processing means, in response to the instruction signal output from said instruction signal outputting means, and for enabling the first program stored in said storing means to be rewritten; and writing means for writing a second program onto the first program stored in said storing means, the second program being different from the first program stored in said storing means, when said control means has enabled said contents of said storing means to be rewritten, and for sending the second program to be written in said storing means to said processing means, so as to enable said processing means to process the input signal based on said second program while said second program is being written onto the first program in said storing means, such that an operation by said writing means for writing the second program onto the first program in said storing means and an operation by said processing means for processing the input signal based on the second program are performed simultaneously, wherein the input signal is continuously processed based on the first and second programs without an interruption.

2. A signal processing apparatus according to claim 1, wherein said instructing means includes switches.

3. A signal processing apparatus according to claim 1, wherein said instruction signal outputting means includes latch means for latching the instruction signal generated by said instructing means in synchronism with said sync signal.

4. A signal processing apparatus according to claim 1, wherein said writing means writes program data included in said second program together with respective address data onto the contents previously stored in said storing means in response to said instruction signal output from said instruction signal outputting means.

5. A signal processing apparatus according to claim 1, wherein said control means has gate means for outputting a write signal to said storing means to permit said writing means to rewrite said contents stored in said storing means in response to said instruction signal output from said instruction signal outputting means.

6. A signal processing apparatus according to claim 1, wherein said control means includes first select gate means for allowing program data included in said second program to be sent from said writing means to said storing means, and second select gate means for allowing address data associated with the respective program data to be sent from said writing means to said storing means, both said program data and said address data being sent in response to said instruction signal output from said instruction signal outputting means.

7. A signal processing apparatus comprising:

storing means for storing contents including a first program;

processing means for processing an input signal based on the first program received from the storing means within a period of a cycle of a sync signal and for outputting a processed signal;

instructing means for generating an instruction signal for instructing rewriting of said first program stored in the storing means;

instruction signal synchronizing means for synchronizing the instruction signal generated by the instructing means with the sync signal to obtain a synchronized instruction signal which is generated immediately after the instruction signal is generated by said instructing means;

control means for setting the storing means in a rewritable state in response to the synchronized instruction signal obtained by the instruction signal synchronizing means; and rewriting means for supplying the storing means with a second program which is different from the first program stored in said storing means, to be stored therein and the processing means with said second program in response to the synchronized instruction signal obtained by the instruction signal means, so as to enable said processing means to process the input signal based on said second program while said second program is being written onto the first program in said storing means, and subsequently supplying the second program stored in the storing means to the processing means in synchronism with the sync signal, such that an operation by said writing means for writing the second program onto the first program in said storing means and an operation by said processing means for processing the input signal based on the second program are performed simultaneously, wherein the input signal is continuously processed based on the first and second programs without an interruption.

8. A signal processing apparatus according to claim 7, wherein said instructing means includes switches.

9. A signal processing apparatus according to claim 7, wherein said instruction signal synchronizing means includes latch means for latching the instruction signal generated by said instructing means in synchronism with said sync signal.

10. A signal processing apparatus according to claim 7, wherein said rewriting means writes program data included in said second program together with respective address data onto the contents previously stored in said storing means in response to said synchronized instruction signal obtained from said instruction signal synchronizing means.

11. A signal processing apparatus according to claim 7, wherein said control means has gate means for outputting a write signal to said storing means to permit rewriting of said contents stored in said storing means in response to said synchronized instruction signal obtained by said instruction signal synchronizing means.

12. A signal processing apparatus according to claim 7, wherein said rewriting means includes first select gate means for transferring program data included in said second program from said rewriting means to said storing means and to said processing means, and transferring the program data of said second program stored in said storing means to said processing means in synchronism with generation of said synchronized instruction signal after program data have been transferred to said storing means, in response to generation of said synchronized instruction signal by said instructing means, and second select gate means for transferring address data from said rewriting means to said storing means until said rewriting means has transferred said program data after generation of said synchronized instruction signal by said instruction signal synchronizing means.

* * * * *